J. W. RUSHTON.
HOG COOP.
APPLICATION FILED NOV. 24, 1919.
1,367,835.
Patented Feb. 8, 1921.
2 SHEETS—SHEET 2.
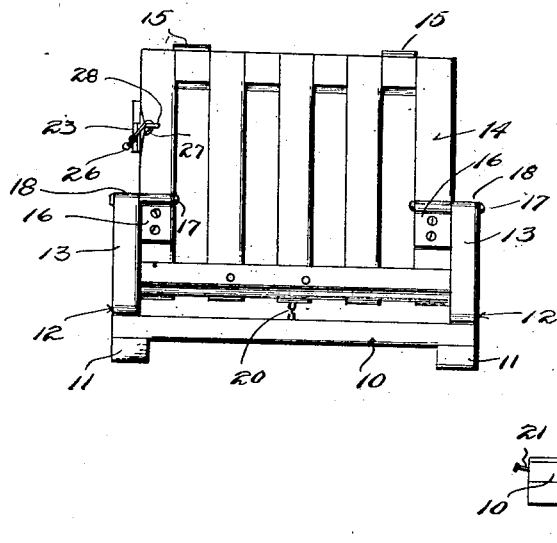
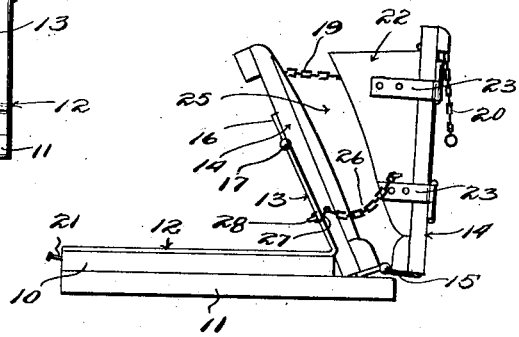
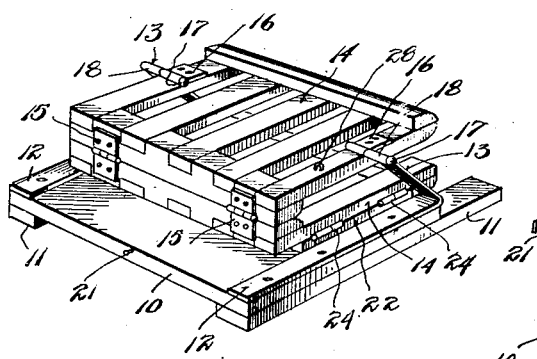
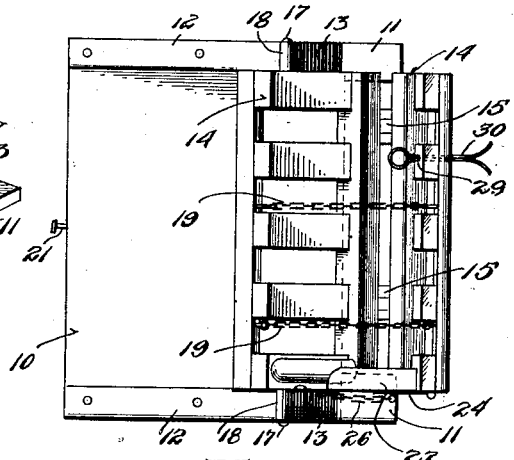
Inventor
J. W. Rushton
Witnesses
By
Attorneys

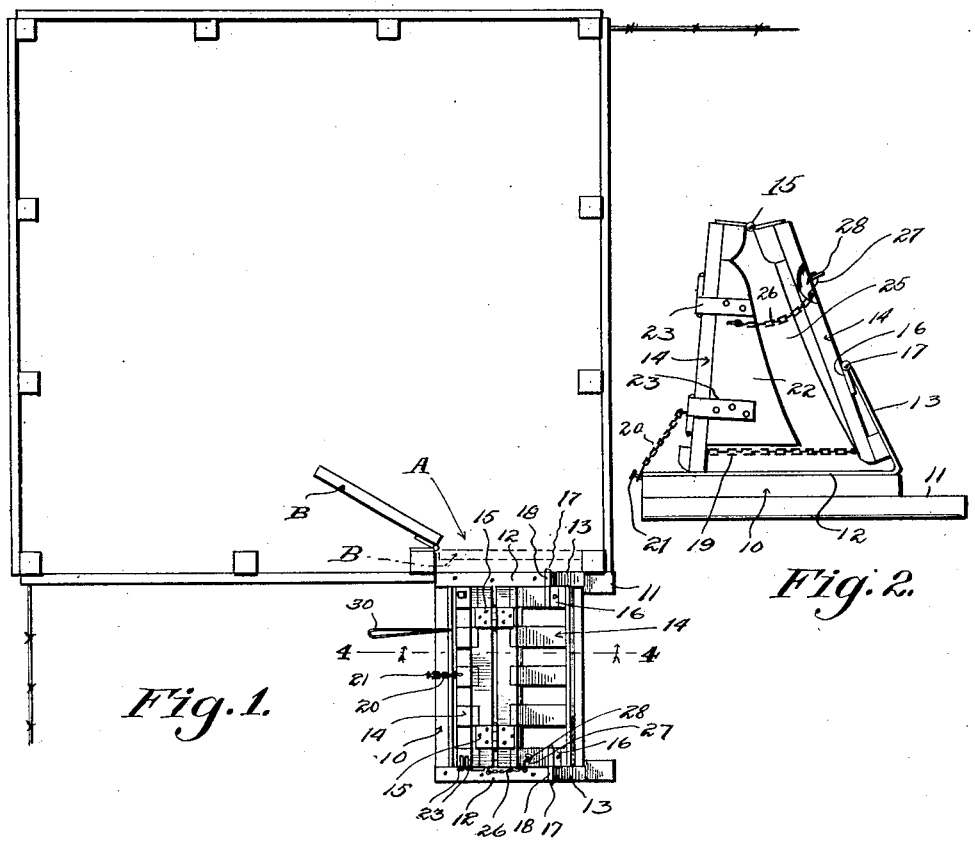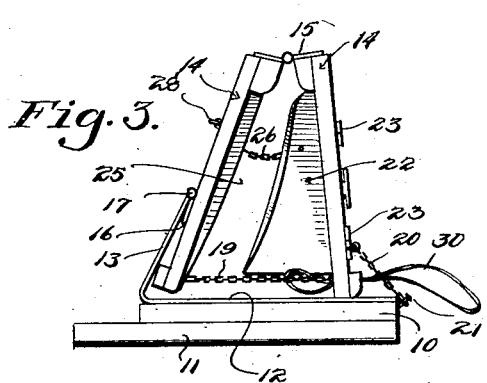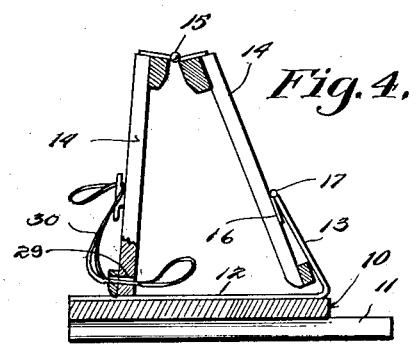

UNITED STATES PATENT OFFICE.

JAMES W. RUSHTON, OF McCORDSVILLE, INDIANA.

HOG-COOP.

1,367,835.   Specification of Letters Patent.   Patented Feb. 8, 1921.

Application filed November 24, 1919. Serial No. 340,125.

*To all whom it may concern:*

Be it known that I, JAMES W. RUSHTON, a citizen of the United States, residing at McCordsville, in the county of Hancock, State of Indiana, have invented certain new and useful Improvements in Hog-Coops; and I do hereby declare the following to be a full, clear, and exact description of the invention, such as will enable others skilled in the art to which it appertains to make and use the same.

The invention relates to a swine coop, and more particularly to the class of hog traps or coops.

The primary object of the invention is the provision of a trap or coop of this character wherein the swine within the pen can be driven into the same and trapped so that each swine will be held to permit the application of the nose ring or for castrating or the immuning operation, the coop or trap being of novel construction adaptable for use by veterinarians or by farmers, and will avoid excessive exertion or labor on the part of the user, and enable the nose ring or the castrating or immuning operation to be performed with despatch.

Another object of the invention is the provision of a coop or trap of this character wherein the same can be readily adjusted to accommodate various sizes of hogs or pigs, and is readily foldable when not in use, so that it can be stored in the least possible space, or can be transported from one point to another.

A further object of the invention is the provision of a coop or trap of this character which is comparatively simple, in construction, thoroughly reliable and efficient in its purpose, strong, durable, and inexpensive to manufacture.

With these and other objects in view the invention consists in the features of construction, combination and arrangement of parts as will be hereinafter fully described, illustrated in the accompanying drawing, and pointed out in the claims hereunto appended.

In the accompanying drawing:

Figure 1 is a top plan view of the coop or trap constructed in accordance with the invention, showing the same positioned at the gate of a pen, the gate being open;

Fig. 2 is an end elevation;

Fig. 3 is a similar view looking toward the opposite end;

Fig. 4 is a sectional view on the line 4—4 of Fig. 1;

Fig. 5 is a side elevation;

Fig. 6 is an end elevation showing the coop or trap adjusted for the castrating operation;

Fig. 7 is a top plan view thereof;

Fig. 8 is a perspective view of the coop or trap folded.

Similar reference characters indicate corresponding parts throughout the several views in the drawing.

Referring to the drawing in detail, the coop or trap comprises a platform 10 which constitutes a floor, in this instance of substantially rectangular shape and made from wood, although it may be of any other shape and made from other suitable material, having on its under face end sills 11 the same being projected for a distance beyond one side of the platform for a purpose presently described.

Mounted on the upper side of the platform 10 at opposite ends thereof are strap irons 12 which are formed with upwardly extending angular supports or brackets 13 the same being located at the edge of the platform next to the extended ends of the cross sills and swingingly supporting the coop or trap frame hereinafter fully described.

The coop or trap frame comprises the slatted side sections 14 which are swingingly connected together through the medium of a pair of strap hinges 15 and on one of these side frames 14 are pivot plates 16 in which are held horizontal pivots 17 journaled in bearings 18 formed at the upper end of the supports or brackets 13 so that the slatted side sections 14 are held for swinging movement thereby. Connected to the side sections 14 at the free opening edges thereof are cross chains 19 which limit the spreading apart of the side sections when swung away from each other.

Carried by the other side section is a latch chain 20 while fixed in the platform 10 is a keeper 21 with which engages any one of the links of the chain 20 to fasten the coop or trap frame in set up position for use. Mounted at one end of the coop or trap frame is a substantially triangularly shaped door 22 which is swingingly supported upon hinges 23 connecting the same to one of the side sections 14 and this door at its free longer edge is inwardly beveled at 24, the door being of a size to provide an opening 25 between its beveled edge 24 and the adjacent side section 14 when the door is closed for the gripping of the neck of a swine to hold it fast for the application of the nose ring on the trapping of the swine within the coop or trap frame.

Swiveled on the door 22 is a latch chain 26 carrying a hook 27 which is adapted to detachably engage in a keeper eye 28 on the side section 14 swingingly mounted on the supports or brackets 13, and in this manner the door will be latched closed. Formed in one of the side sections 14 near the open end of the coop or trap frame opposite the end with the door 22 is a suitable opening 29 in which is slidably fitted a flexible tie cable 30 adapted to be looped about one of the legs of the swine for holding the same, and this cable is engageable about the rope holder 31 mounted upon the side section 14 of the coop frame or trap.

In the use of the coop or trap the same is set up and positioned at the open gateway A of a pen as shown in Fig. 1 of the drawing, so that a pig or hog can be driven from the pen into the coop or trap frame and thereafter the gate B of the pen is closed thus imprisoning or confining the pig or hog within the coop or trap. The pig or hog can be tied and thereafter the nose ring applied. However, it is usual for the pig or hog to attempt an exit from the coop or trap through the end thereof having the swinging door 22, and on forcing its head through the opening 25 the pig or hog will be caught by the door and in this manner the nose ring can be readily applied and thereafter the door 22 opened for freeing the pig or hog.

Now for the castrating operation, the pig or hog is driven into the coop or trap frame and tied by the cable 30 and thereafter the coop or trap frame is turned over on the pivots 17 upsetting the pig or hog for operating purposes. After the operation has been performed, the coop or trap frame is inverted to normal position and the pig or hog released by the opening of the door 22 as will be clearly apparent.

When the coop or trap frame is turned over for the castrating operation it rests upon the extended ends of the cross sills 11 beyond the platform 10 and against the brackets 13 of the arms 12 as will be clearly apparent in Fig. 6 of the drawings.

When the coop or trap is not in use it is folded in the position shown in Fig. 8 of the drawings to occupy the least possible space for storage or to permit the easy and convenient transportation thereof.

From the foregoing it is thought that the construction and manner of operation of the coop or trap will be clearly understood, and therefore a more extended explanation has been omitted.

What is claimed is:

1. A hog trap comprising a base, hinge strips secured to the base and having free end portions extending upwardly and inwardly over said base, a frame having side walls hinged together, means limiting hinge movement of the walls in one direction, hinge plates secured to one wall at a point intermediate its height and having connection with the upper ends of the hinge strips to pivotally mount the housing for swinging movement about said base, and means for releasably securing the housing against swinging movement.

2. A hog trap comprising a base, cross bars extending transversely of the base and beyond one side thereof, hinge strips carried by the base and extending upwardly and inwardly above the base, a frame having side walls, hinge elements carried by one wall at a point intermediate its height and connected with the hinge strips to mount the frame for swinging movement from a position resting upon said base to an inverted position resting upon the extended end portions of the cross bars, and means for releasably holding said frame against swinging movement.

In testimony whereof, I affix my signature, in the presence of two witnesses.

JAMES W. RUSHTON.

Witnesses:
 EDWIN L. CROUCH,
 JAMES W. TRITTIPO.